SUCTION ROLL NOZZLE WITH MANIFOLD AND VALVE MEANS

Filed Nov. 17, 1954 8 Sheets-Sheet 1

INVENTORS
ALEXANDER E. STEWART
VIVIAN S. GRATER
BY Fetherstonhaugh & Co
ATTORNEYS

SUCTION ROLL NOZZLE WITH MANIFOLD AND VALVE MEANS

Filed Nov. 17, 1954 8 Sheets-Sheet 2

INVENTORS
ALEXANDER E. STEWART
VIVIAN S. GRATER
BY Fetherstonhaugh & Co.
ATTORNEYS

SUCTION ROLL NOZZLE WITH MANIFOLD AND VALVE MEANS

Filed Nov. 17, 1954 8 Sheets-Sheet 3

INVENTORS
ALEXANDER E. STEWART
VIVIAN S. GRATER
BY Fetherstonhaugh & Co.
ATTORNEYS INVENTORS
ALEXANDER E. STEWART
VIVIAN S. GRATER
BY Fetherstonhaugh & Co.
ATTORNEYS

SUCTION ROLL NOZZLE WITH MANIFOLD AND VALVE MEANS

Filed Nov. 17, 1954 8 Sheets-Sheet 5

INVENTORS
ALEXANDER E. STEWART
VIVIAN S. GRATER
By Fetherstonhaugh & Co.
ATTORNEYS

SUCTION ROLL NOZZLE WITH MANIFOLD AND VALVE MEANS

Filed Nov. 17, 1954 8 Sheets-Sheet 6

INVENTORS
ALEXANDER E. STEWART
VIVIAN S. GRATER
BY Fetherstonhaugh & Co.
ATTORNEYS

SUCTION ROLL NOZZLE WITH MANIFOLD AND VALVE MEANS

INVENTORS
ALEXANDER E. STEWART
VIVIAN S. GRATER
BY Fetherstonhaugh & Co.
ATTORNEYS INVENTORS
ALEXANDER E. STEWART
VIVIAN S. GRATER
BY Fetherstonhaugh & Co.
ATTORNEYS United States Patent Office 2,884,059

Patented Apr. 28, 1959

2,884,059

SUCTION ROLL NOZZLE WITH MANIFOLD AND VALVE MEANS

Alexander Eric Stewart, St. Lambert, Quebec, and Vivian Somers Grater, Pointe Claire, Quebec, Canada, assignors to Dominion Engineering Works Limited, Montreal, Quebec, Canada Application November 17, 1954, Serial No. 469,486

4 Claims. (Cl. 162—370)

This invention relates to an improved suction pick-up roll assembly for Fourdrinier and other paper making machines.

The conventional type suction pick-up roll functions to transfer the full width of the paper web from the delivery end of the forming wire onto a carrying felt passing around said roll. The carrying felt delivers the web to a transfer press through which the web is passed to succeeding wet-press sections and other units of the paper machine.

When starting up the paper making machine the full width of the paper web is passed through the transfer press and the succeeding first and second wet-press sections. At the first wet-press, a lead strip is cut from the paper web and passed through the second wet-press and succeeding units of the paper making machine. The body of the web from which the lead strip is cut is directed upwardly around the top roll of the first wet-press and is doctored off into a belt-conveyor from which the "broke" must be removed and transported either to the "broke" beater beneath the calender stack or to the "broke" pit located beneath the delivery end of the forming wire of the paper machine, in which case it must first pass through a beater or pulper where it is mixed with water to reduce its consistency to a valve which the "broke" pit can handle. The accumulation of "broke" at the first wet-press presents a serious and expensive "broke" disposal problem. The "broke" accumulating on the top roll of the first wet-press frequently "balls up" on the pivoted "broke" doctor blade and causes it to swing away from said roll with the result that, instead of being delivered to the belt conveyor, the "broke" continues to build up on the top roll and doctor blade of the first wet-press, until this condition is remedied by an attendant. Moreover, the large amount of "broke" accumulating at the first wet-press requires considerable time and manual labour for its transportation to the distant "broke" beater located below the calender stack or requires an expensive auxiliary beater to permit its entry into the nearer "broke" pit.

From the foregoing it will be seen that, with the conventional type suction pick-up roll which picks up the full width of the paper from the delivery end of the forming wire, the "broke" disposal problem is much more serious and expensive than in the case of Fourdrinier paper machines which are not equipped with suction pick-up rolls. In the latter case the lead strip is cut from the paper web at the delivery end of the forming wire and the remainder of the width of the web from which the lead strip is cut can be passed directly downwardly, as "broke," from the delivery end of the forming wire to the underlying "broke" pit.

One object of the present invention is to simplify the "broke" disposal problem in the case of paper machines equipped with suction pick-up rolls by providing a pick-up roll designed to initially pick up only a lead strip which is cut from the paper web at the delivery end of the forming wire, then, after the lead strip has been passed therefrom through the press sections and succeeding units of the paper machines, to pick up and deliver the full width of the paper web to said press sections. This object is achieved by providing a suction pick-up roll having at least one nozzle which is transversely divided into two non-communicating compartments of unequal length, the shorter compartment of the nozzle being in constant communication with a source of suction and the longer compartment being connected to said source of suction through valve means operable to establish and disrupt communication between said source of suction and said longer compartment. When the paper making machine is being started up the longer compartment of the suction nozzle is shut off from communication with the source of suction by said valve means and is placed in communication with the atmosphere. The shorter compartment, being in communication with the source of suction, causes the lead strip cut from the web of paper at the delivery end of the forming wire to be drawn onto a carrying felt passing around said roll and to be passed through the transfer press and succeeding press sections and units of the paper making machine. After the lead strip has been threaded through the press sections and into the drying section of the paper making machine communication is established between the source of suction and the longer compartment of the suction roll nozzle so that, thereafter, the pick-up roll picks up and transfers the full wdith of the paper web from the forming wire to the carrying felt passing around the pick-up roll.

Another object of the invention is to provide a suction pick-up roll having two nozzles arranged therein in side-by-side relation to pick up, first, the lead strip and then the full width of the paper web, one of said nozzles being a low vacuum nozzle whose primary purpose is to overcome centrifugal forces set up in the paper during its passage around the circumference of the pick-up roll so that the paper will thus be retained on the carrying felt of the suction roll until it is transferred to and carried onward by the carrying felt of the transfer press through which the paper is passed to succeeding suction press sections and other units of the paper making machine.

A further object of the invention is to provide a suction pick-up roll assembly of the character described wherein the valve mechanism through which the longer suction compartment of each nozzle is connected to the source of suction is located externally of the roll and is accessible for convenient operation and maintenance.

A further object of the invention is to provide a suction roll containing a suction nozzle which is forced into sealing engagement with the inner surface of the roll shell by inflated pressure applying tubes interposed between the nozzle and a suction box on which the nozzle is mounted, this feature of the invention being not only useful in connection with the particular type of suction pick-up roll herein described but being also capable of general application to other types of suction rolls to provide proper sealing contact between the suction nozzle and the roll shell against which the nozzle is pressed.

Other objects, advantages and characteristic features of the invention will appear from the following detailed description of the preferred embodiment shown in the accompanying drawings, in which—

Fig. 1 is a top plan view of a suction pick-up roll installation designed in accordance with the invention.

Fig. 1*a* is a sectional view of a portion of the assembly shown in Fig. 1.

Figure 4:
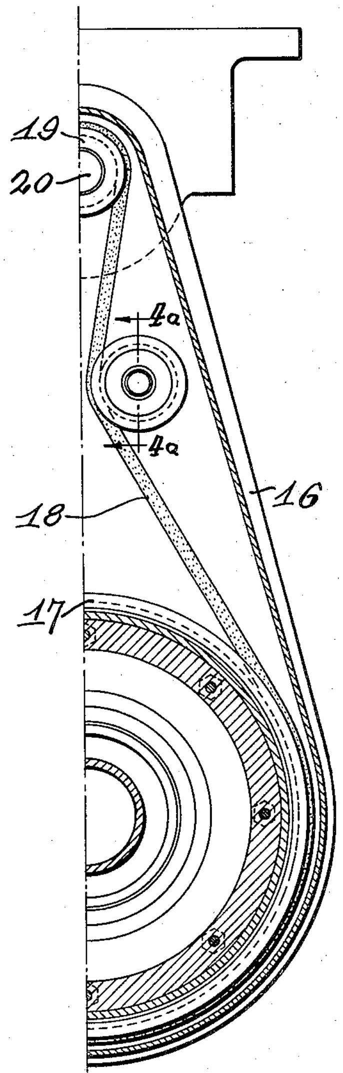
Fig. 4 is a partial sectional view taken substantially along the section line 4—4 of Fig. 3.
Figure 4A:
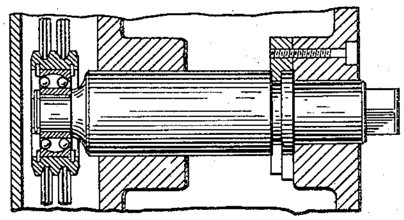

Fig. 4*a* is a detail sectional view along section line 4*a*—4*a* of Fig. 4.

Figures 3, 22, 25:
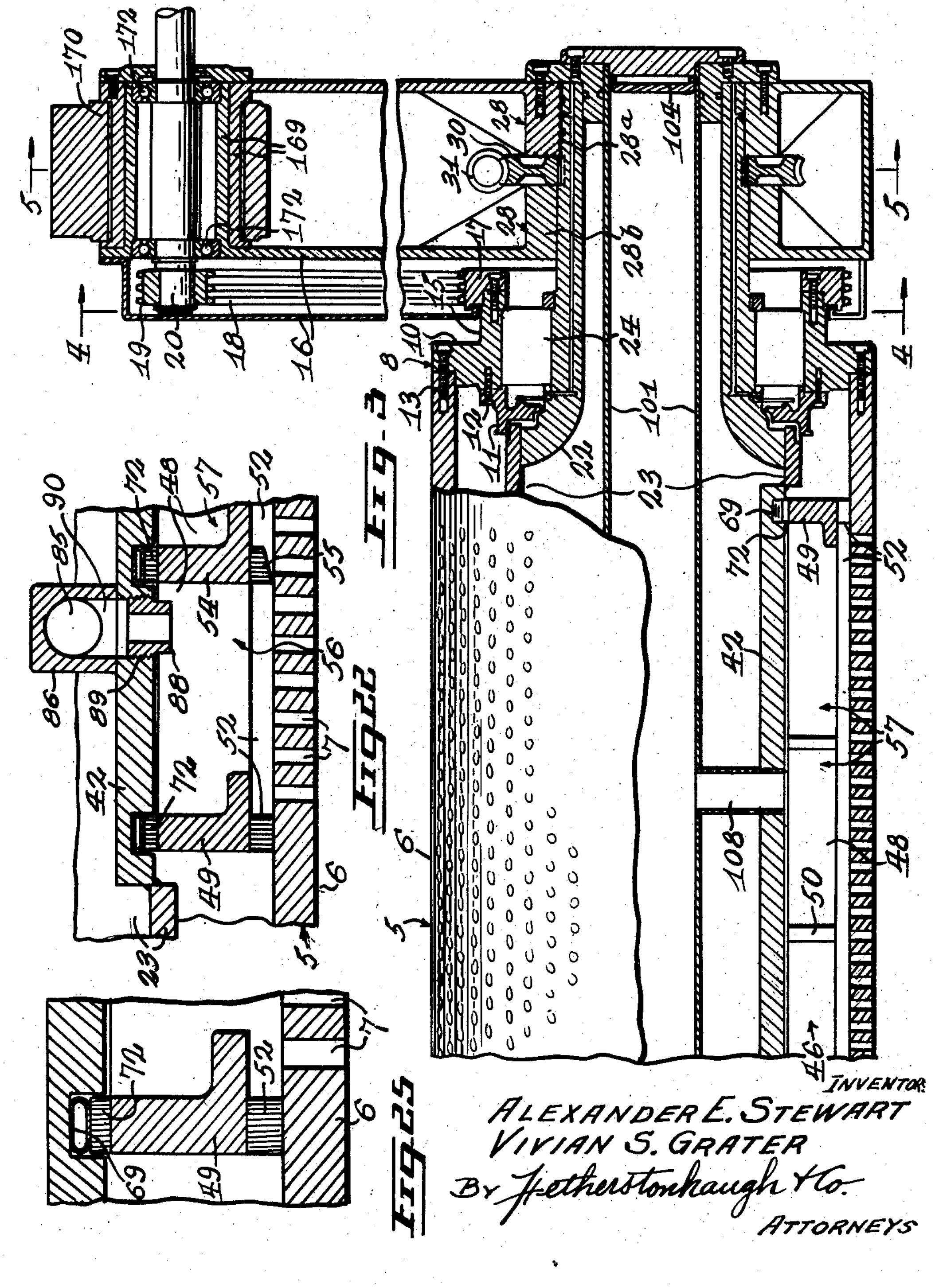
Fig. 3 is a sectional view showing the manner in which one end of the pick-up roll is journalled in a gear casing housing the roll driving mechanism. This view also shows a suction box adjusting mechanism for changing the angular relation between the roll shell and the suction box and nozzle assembly mounted therein.
Figure 5:
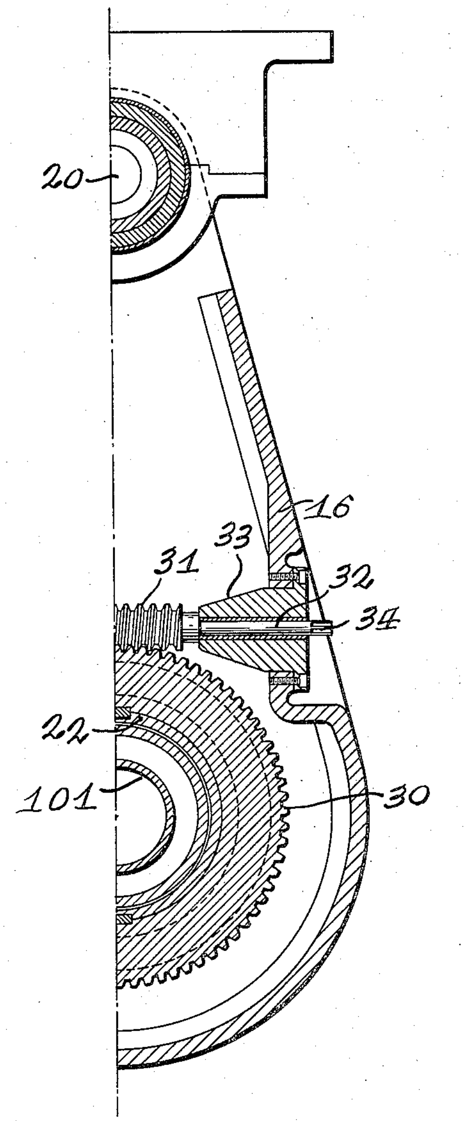

Fig. 5 is a sectional view taken substantially along the section line 5—5 of Fig. 3.

Figures 6, 21:
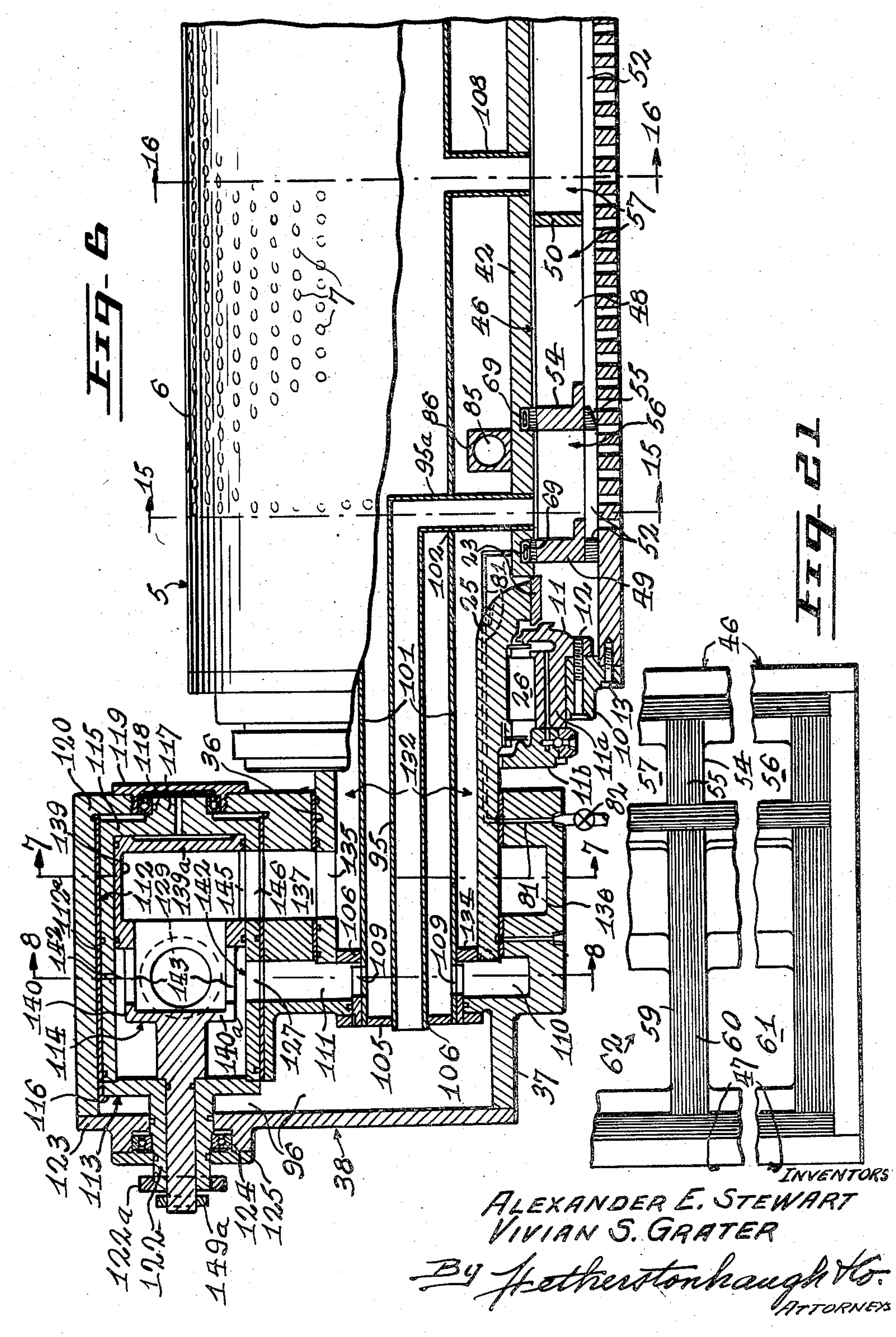

Fig. 6 is a sectional view showing the manner in which the other end of the pick-up roll is journalled in the body portion of a vacuum control-valve assembly.

Figures 7, 8, 9:
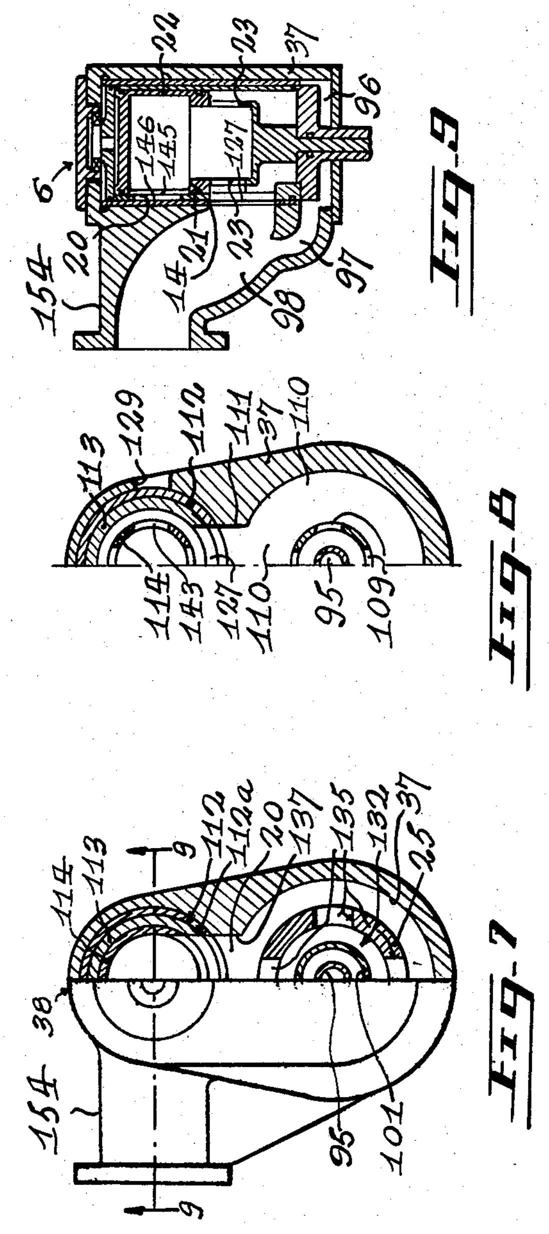

Fig. 7 is a view partly in elevation and partly in section of the control valve assembly shown in Fig. 6, the plane of the section being substantially along the section line 7—7 of Fig. 6.

Fig. 8 is a partial sectional view taken substantially along the section line 8—8 of Fig. 6.

Fig. 9 is a sectional view taken substantially along the section line 9—9 of Fig. 7.

Figures 10, 11, 12, 12A, 13, 14:
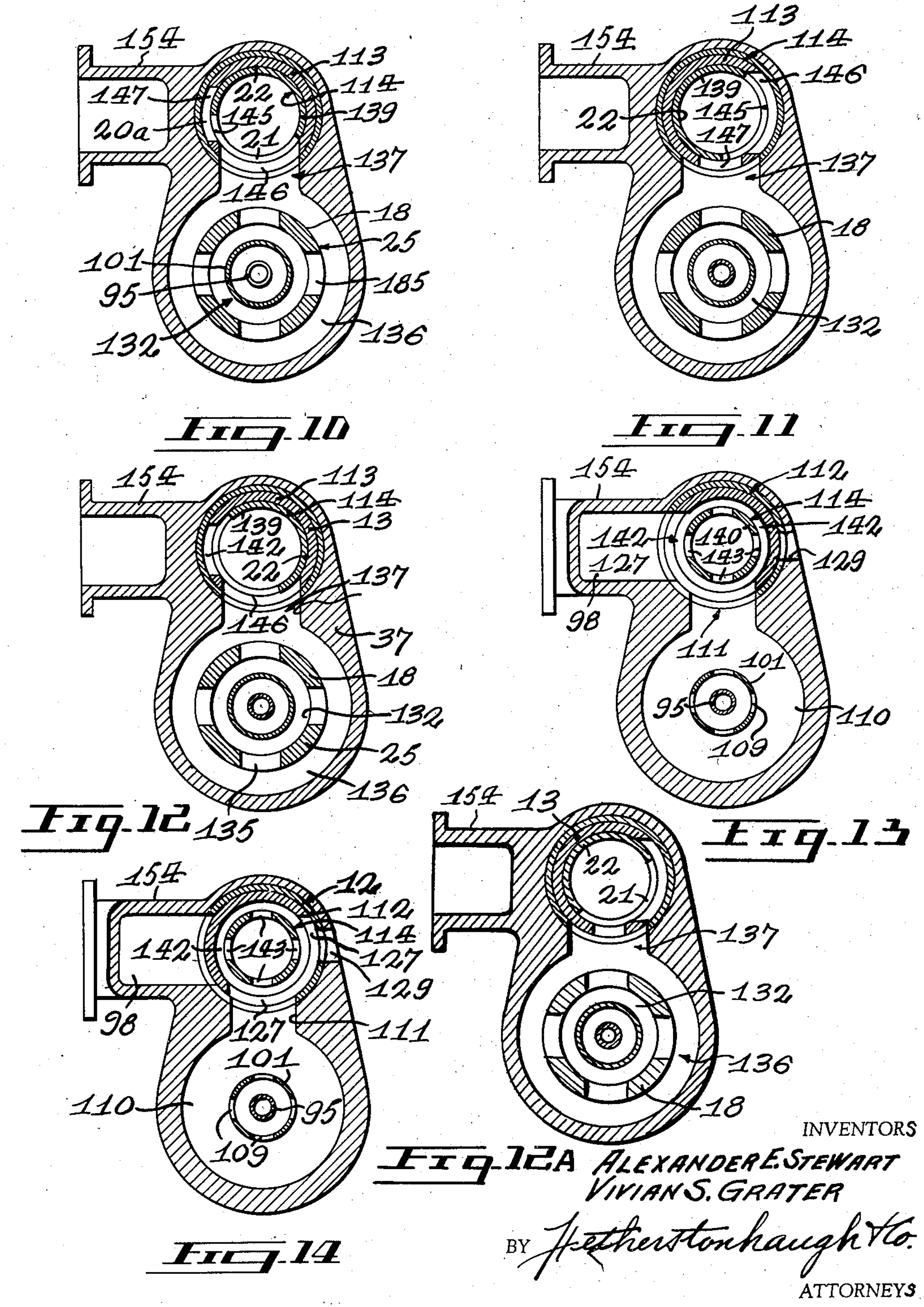

Figs. 10 and 11 are sectional views taken along the same section line as the sectional portion of Fig. 7 but showing the component valves of the control valve assembly in different positions.

Figs. 12 and 12*a* are views similar to Figs. 10 and 11 but showing the valves 113 and 114 in a different position of relative angular adjustment.

Figs. 13 and 14 are complete sectional views taken along the same section line as Fig. 8 and illustrate the manner in which the valves shown in these figures are operated to different control positions.

Figure 1:
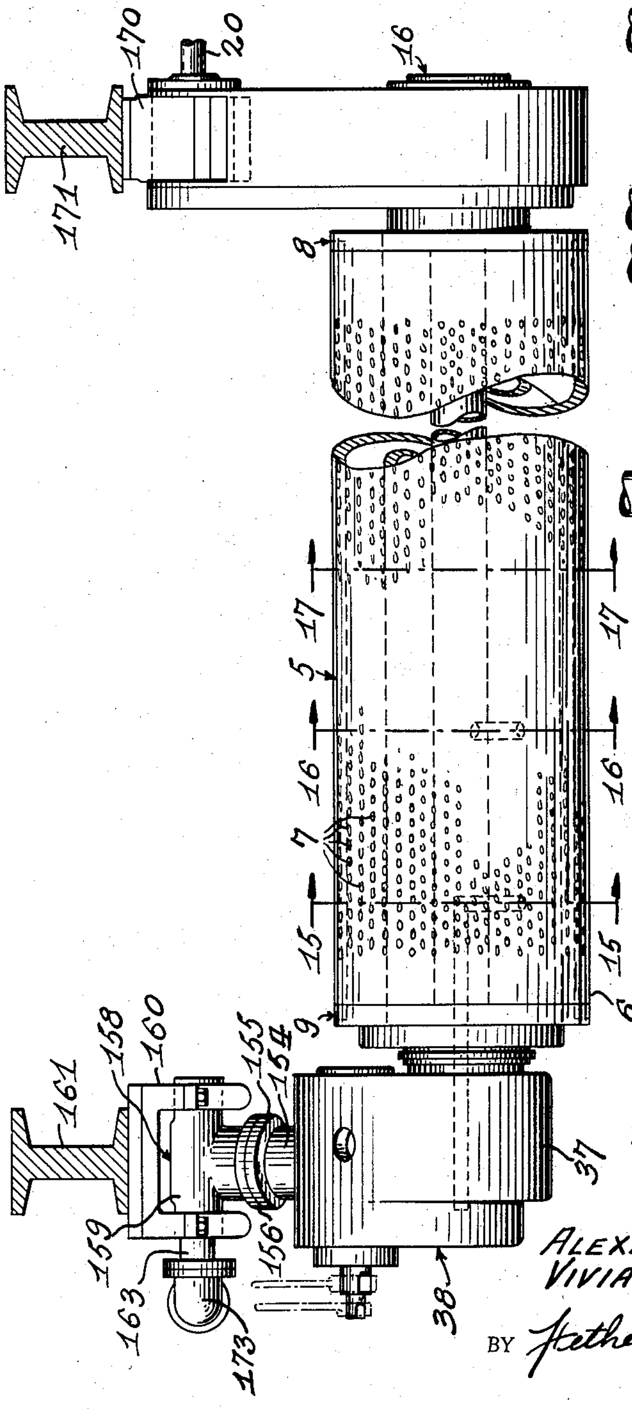
Figures 15, 16, 17, 24:
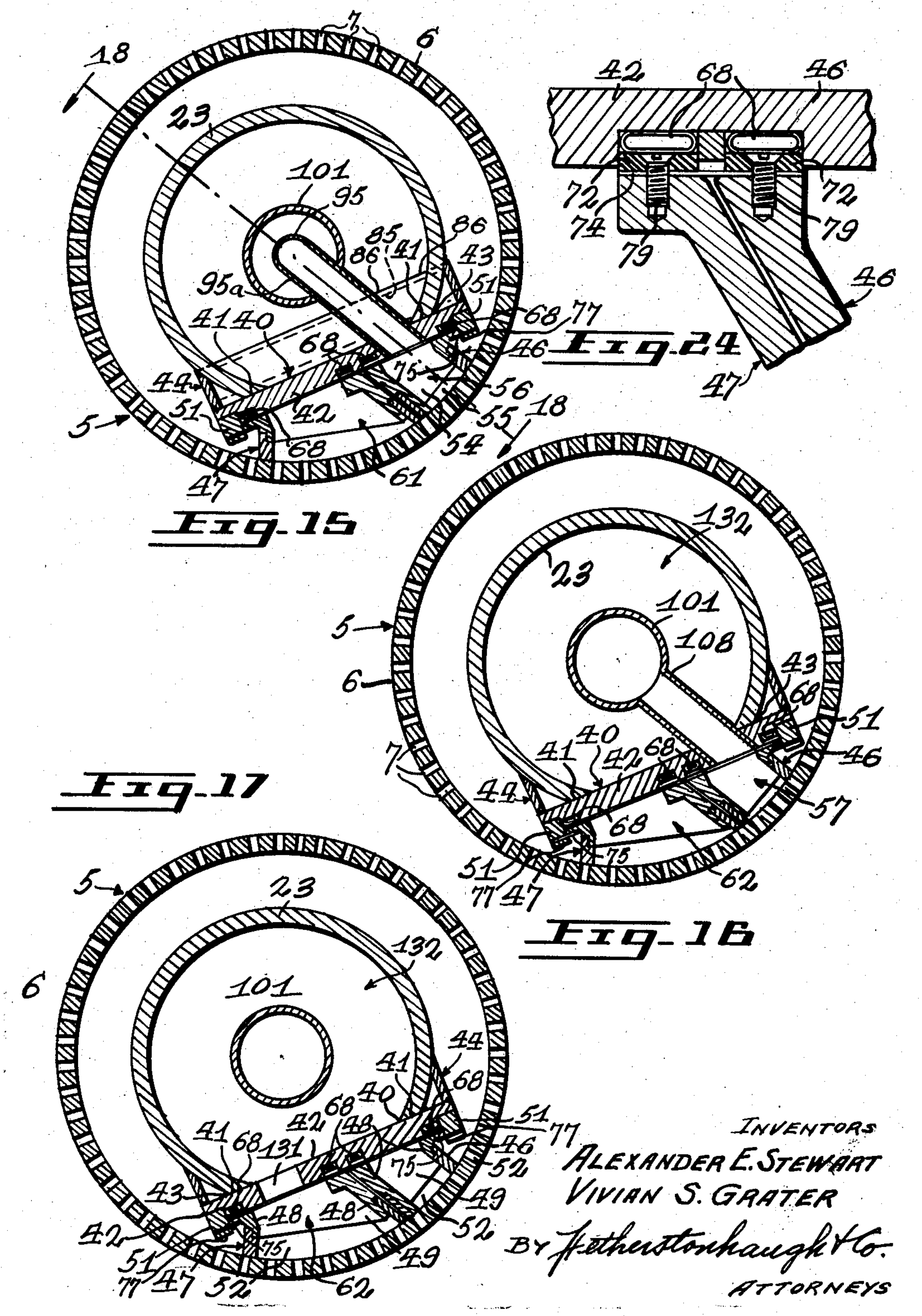

Fig. 15 is a sectional view along the section line 15—15 of Figs. 1 and 6.

Fig. 16 is a sectional view along the section line 16—16 of Figs. 1 and 6.

Fig. 17 is a sectional view along section line 17—17 of Fig. 1.

Figures 18, 19:
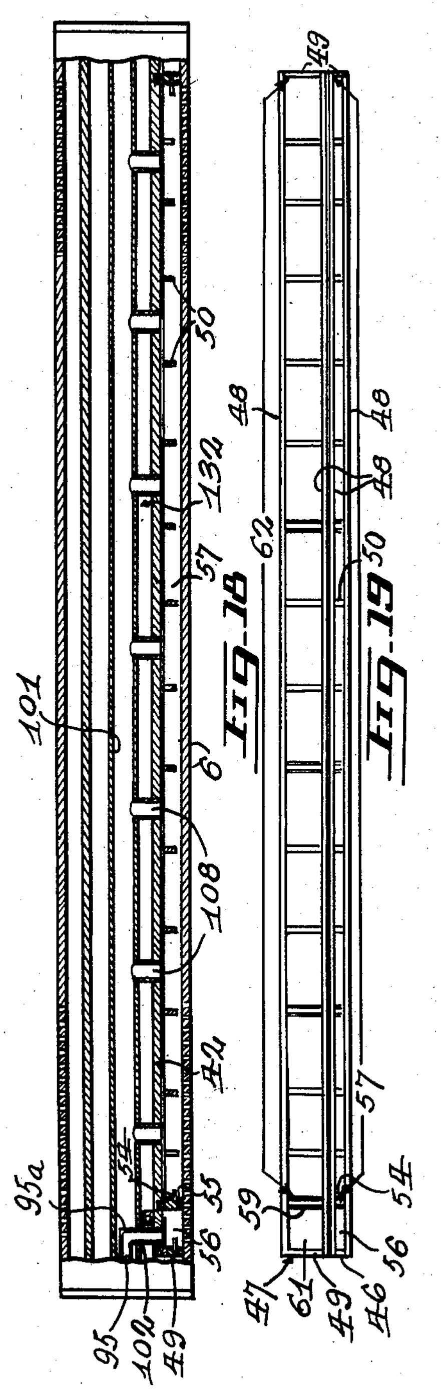

Fig. 18 is a sectional view along the section line 18—18 of Fig. 15.

Fig. 19 is a plan view of the suction nozzle and deckle strips forming part of the suction box and nozzle assembly shown in Figs. 15 to 18 inclusive.

Figures 2, 20:
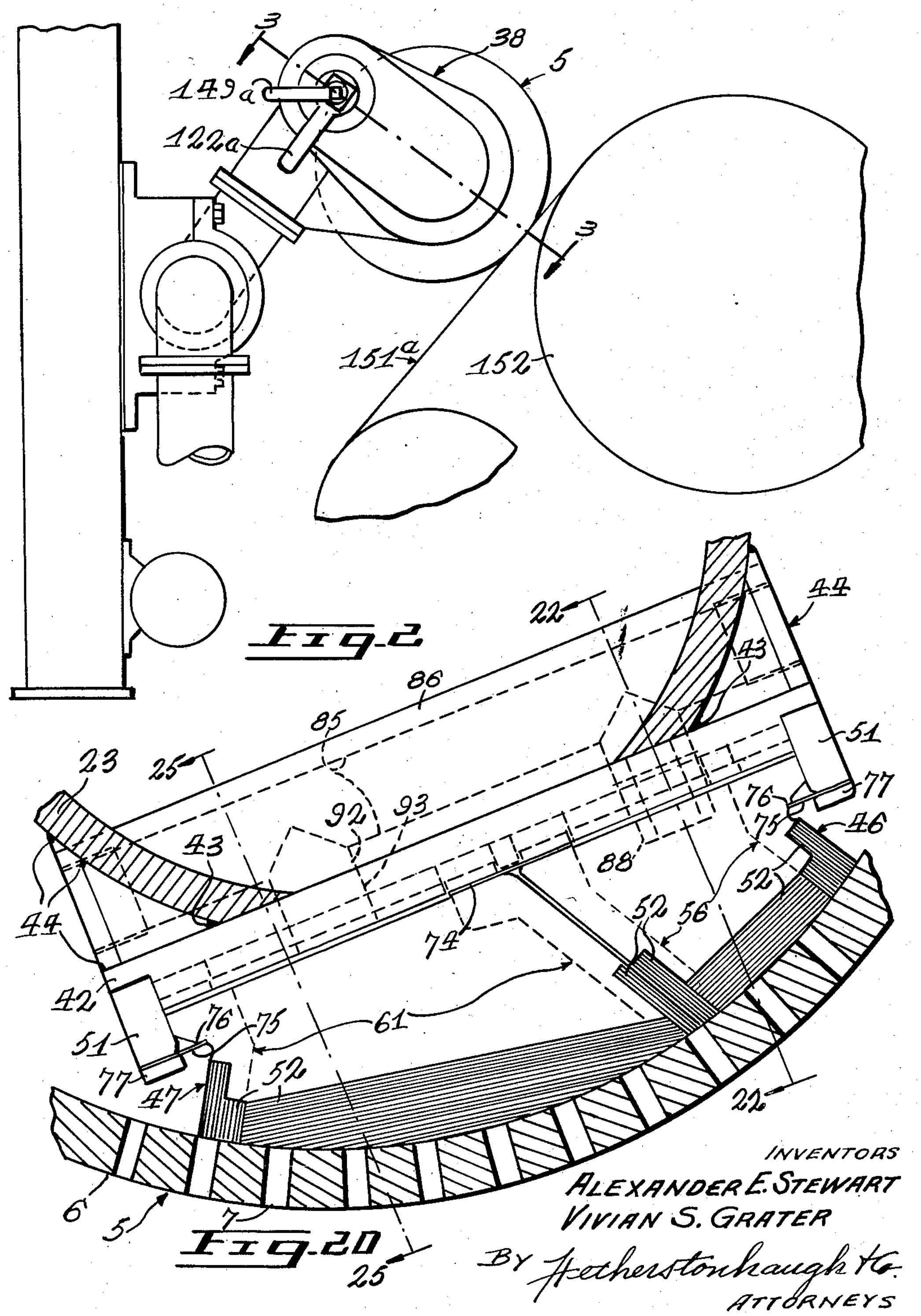
Fig. 2 is a side elevational view of the installation appearing in Fig. 1 and shows the pick-up roll in operative relation to the forming wire of a Fourdrinier paper making machine.

Fig. 20 is a fragmentary detail view showing the suction roll shell and suction box in section and the nozzle assembly of the suction box in end elevation.

Fig. 21 is a detail view, showing, in plan, a portion of the nozzles and deckle strips appearing in Fig. 20.

Fig. 22 is a detail sectional view taken along the section line 22—22 of Fig. 20.

Figure 23:
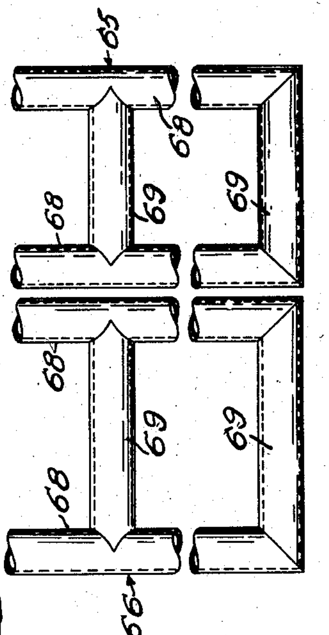

Fig. 23 is a detail view showing, in plan, portions of two pneumatic tube arrangements employed for pressing the sealing or deckle strips of the suction nozzle against the shell of the suction roll.

Fig. 24 is a detail sectional view showing the nozzles of the suction roll joined together by a joint plate. This view also shows the manner in which the nozzles are equipped with non-corrosive strips which bear against the tubes of the pneumatic tube arrangement shown in Fig. 23 and other preceding figures.

Fig. 25 is a sectional view along section line 25—25 of Fig. 20.

In these drawings, our improved suction pick-up roll is generally indicated at 5. The roll shell 6 is drilled in the usual manner to provide suction openings 7 and is supported by and between sectional ring-shaped end heads generally indicated at 8 and 9. Each of these end heads (Figs. 3 and 6) comprises outer and inner ring members 10 and 11 bolted together as indicated at 12, the outer ring member 10 being also bolted to the adjacent end of roll shell 6, as indicated at 13.

The outer ring member 10 of roll head 8 (Fig. 3) is provided with an extension 15 which extends into one end of a gear casing 16 and carries a sprocket 17. This sprocket 17 is connected by roll driving chains 18 to a drive sprocket 19 carried by a drive shaft 20. The roll head 8 surrounds and is rotatably mounted on the hollow journal 22 of a tubular suction box 23 which extends longitudinally within the roll shell 6. In this connection it will be noted that the outer ring member 10 of roll head 8 is mounted on journal 22 by ball bearings 24.

The inner ring member 11 of roll head 9 (Fig. 6) is formed with a cylindrical extension **11*a* which fits within the outer ring member 10 and is rotatably mounted on the remaining hollow end journal 25 of suction box 23 by ball bearings 26. A ring-shaped dust-guard 11*b* is preferably secured to extension 11*a* to exclude dust from bearings 26**.

The suction box journal 22 (Figs. 3 and 5) extends through and is rotatably supported by a sectional cylindrical bearing member 28 carried by the same end portion of gear casing 16 in which sprocket 17 is arranged. Bearing 28 is divided into separated sections **28*a* and 28*b* having opposing ends spaced apart to accommodate therebetween a worm gear 30 which is keyed to journal 22 and is driven by a worm 31. The worm 31 is carried by a worm shaft 32 which extends into gear casing 16 through a bearing 33 and is provided with a non-circular outer end 34 to which a wrench or other tool may be applied to rotate suction box 25 to various positions of angular adjustment relative to suction roll shell 6**.

The suction box journal 25 (Fig. 6) extends into and is rotatably supported by a bearing 36 constituting one end portion of the valve body 37 of a control valve assembly generally indicated at 38.

Suction box 23 consists of a hollow tube having its ends fitted on and welded to the inner ends of hollow journals 22 and 25, as shown in Figs. 3 and 6. An intermediate portion of the tubular wall of suction box 23 is cut away (Figs. 15 to 17 inclusive) to provide a suction box opening 40 bounded at the sides by flat cover seating surfaces 41 against which a substantially flat suction box cover plate 42 is fitted, said cover plate being welded in place, as indicated at 43 and 44.

Two separately formed generally rectangular suction nozzles, respectively indicated at 46 and 47, are arranged between the suction box cover plate 42 and the roll shell 6. Each nozzle is defined by side wall 48 and end walls 49 and is internally reinforced by transversely extending reinforcing ribs 50. These nozzles are positioned in side-by-side relation between retaining strips 51 secured to the lateral marginal portions of suction box cover plate 42.

At the mouth portion of each of the nozzles 46 and 47, the side and end walls 48 and 49 carry rigidly attached deckles or wear strips 52 which are pressed into sealing engagement with the inner surface of roll shell 6, as hereinafter described.

Nozzle 46 is internally divided by transversely extending partition 54 and associated transversely extending roll shell engaging deckle or sealing strip 55 into two non-communicaing suction compartments 56 and 57 of unequal length. Nozzle 47 is similarly divided by transverse partition 59 and associated deckle or sealing strip 60 into two non-communicating suction compartments 61 and 62 of unequal length. Compartment 61 is the same length as compartment 56 but is much wider in the circumferential direction of roll shell 6. Similarly compartment 62 is the same length as compartment 57 but is much wider in the circumferential direction of the roll shell.

The nozzle carried deckles or sealing strips 52, 55 and 60 may be composed of any suitable non-corrosive material having a high wear resistance and may be removably secured to the nozzles 46 and 47 in any suitable manner so that they may be readily replaced when worn or otherwise rendered unfit for further service. The deckles or sealing strips of the two nozzles are pressed into sealing engagement with the inner surface of roll shell 6 by the pressure of two inflated grid-like pneumatic sealing tube arrangements, generally indicated at 65 and 66 in Fig. 23. Each of these pneumatic tube arrangements comprises longitudinally extending tubes 68 integrally joined together by communicating transversely extending tubes 69. The tubes 68 and 69 of each tube arrangement are fitted, respectively, in longitudinally and transversely extending recesses 70 and 71 formed in the suction box cover plate 42. Non-corrosive nozzle engaging strips 72 are slidably fitted in the mouth portions of the suction box cover recesses 70 and 71 in contact with the pneumatic tubes contained in said recesses.

The side tubes 68 of tube arrangement 65 and their contacting non-corrosive strips 72 exert outward pressure against the adjacent edges of the side walls 48 of nozzle 46. The end tubes 69 of tube arrangement 65 and their contacting non-corrosive strips 72 act similarly against the adjacent edges of the end walls 49 of nozzle 46. The intermediate tube 69 of tube arrangement 65 and its contacting non-corrosive strip 72 act against the adjacent edge of the intermediate partition 54. The tubes 68 and 69 and contacting non-corrosive strips 72 of tube arrangement 66 act in the same manner against adjacent edges of the side and end walls and intermediate partition of nozzle 47.

The two nozzles 46 and 47 are joined together by a spring plate 74 (Figs. 20 and 24) of suitable stiffness and are held against the pressure-applying non-corrosive strips 72 by means of springs 75 (Fig. 20) which are fastened to the previously mentioned nozzle-retaining strips 51. These springs 75 are disposed in overlying retaining engagement with shoulder portions 76 of the outer side walls 48 of the nozzles and are held to the retaining strips 51 by clamping plates 77.

The non-corrosive strips 72 associated with each nozzle are preferably fastened to the nozzle by screws 79, as shown to advantage in Fig. 24 to provide a unitary assembly of the nozzles and strips.

Any suitable arrangement of air supply lines may be provided for supplying air to the pneumatic tube arrangements 65 and 66. In Fig. 6 tube arrangement 65 is shown connected to an air supply line 81 controlled by a valve 82 and a similar air line (not shown) may be provided for supplying air to tube arrangement 65.

The compartments 56 and 61 of nozzles 46 and 47 are in constant communication with each other through an interconnecting port 85 (see Figs. 6, 20 and 22) of a cross conduit 86 carried by suction box cover plate 42. Conduit 86 is closed at both ends and projects into the interior of suction box 23. One end of port 85 communicates with compartment 56 through a vacuum reducing metering plug 88 fitted in an opening 89 in cover plate 42, said opening 89 being in line with an opening 90 in conduit 86. The other end of port 85 is in communication with compartment 61 of nozzles 47 through relatively large registering openings 92 and 93 provided in conduit 86 and cover plate 42.

A longitudinally extending suction manifold 95 of tubular form (Fig. 6) is centrally arranged in roll shell 6 and has a right angularly directed end portion 95*a* connected to compartment 56 of suction nozzle 46. The other end of manifold 95 opens into a space 96 of valve body 37. This space 96 is in open communication, through passage 97 (Fig. 9) with a main suction connection passage 98 of valve body 37 to which the suction pump (not shown) is connected. It will thus be seen that the interconnected compartments 56 and 61 of nozzles 46 and 47 are constantly connected to the vacuum pump or other sources of suction during operation of the suction roll. Due to the direct connection of nozzle compartment 56 with main suction connection passage 98 and to the vacuum-reducing effect of metering plug 88, the vacuum maintained in compartment 61 of nozzle 47 is appreciably lower than that maintained in compartment 56 of nozzle 46. The amount of vacuum maintained in compartment 56 of nozzle 46 may be regulated by any suitable form of vacuum breaker. Similarly the vacuum in compartment 61 of nozzle 46 may be varied by using different sizes of vacuum reducing plugs 88.

A second longitudinally extending suction manifold 101 is arranged in suction roll 5 in spaced relation to the inner surface of roll shell 6. This manifold 101 surrounds and is spaced from the longitudinally extending portion of manifold 95 and is provided with an opening 102 through which the right angularly directed end 95*a* of manifold 95 extends. One end portion of manifold 101 extends into gear casing 16 through suction roll journal 22 and is closed off by end closure plate 104. The other end portion of manifold 101 extends into valve body 37 through roll journal 25 and is closed off by an end closure plate 105 provided with an opening 106 through which the adjacent end of manifold 95 extends into the space 96 of the valve body 37. The portion of manifold 101 lying within roll shell 6 is in constant communication with compartment 57 of nozzle 46 through radially extending tubular connecting members 108 having their inner ends secured to said manifold and their outer ends fitted in openings provided in suction box cover 42.

A portion of manifold 101 which is positioned in valve body 37 beyond the adjacent end of roll journal 25 is provided with a circular series of ports 109 placing the interior of the manifold in communication with a surrounding recess 110 formed in the valve body. Recess 110 is connected by passage 111 to a cylindrical valve chamber 112 which is formed in the valve body 37 and contains outer and inner hollow cylindrical valves 113 and 114.

The outer valve 113 constitutes the main shut-off valve for establishing and disrupting communication between valve chamber 112 and the adjoining main suction connection passage 98. It comprises a hollow cylinder of uniform diameter closely fitting the valve chamber liner 112*a* and provided with end walls 115 and 116. The end wall 115 carries a short journal of stub shaft 117 rotatably supported by an anti-friction bearing 118 housed in a removable cover plate 119 closing an opening in the end wall 120 of the valve chamber. The remaining end wall 116 of valve 113 carries an elongated hollow operating spindle 122 which extends outwardly through an opening in the adjacent end wall 123 of valve chamber 112 and is operated by hand lever 122*a* to rotate valve 113 to different positions controlling communication between valve chamber 112 and suction-connection passage 98. Spindle 122 is rotatably supported by anti-friction bearing 124 contained in a bearing housing 125 carried by the end wall 123 of the valve chamber.

Valve 113 is provided with a port 127 which places the interior of the valve in communication with valve body port 111 and suction connection passage 98 when valves 113 and 114 are rotated to the position shown in Figs. 10 and 13. In this position of valve 113 the compartment 57 of nozzle 46 is connected to main suction passage 98 to create a vacuum in said compartment. When the valves 113 and 114 are rotated to the cut-off position shown in Figs. 11 and 14 a solid portion of the valve 113 (Fig. 14) cuts off communication between main suction passage 98 and the interior of the valve and the valve port 127 is positioned to place the valve body port 111 and the interior of valve 113 in communication with the atmosphere through a vent port 129 provided in the wall of valve chamber 112. In this second position of valve 113 the compartment 57 of nozzle 46 is connected to atmosphere so that the vacuum previously established therein is broken.

The suction compartment 62 of nozzle 47 is connected through ports 131 in suction box cover 42 to a tubular suction manifold 132 having its outer wall formed by the tubular shell and journals 22 and 25 of the suction box 23 and having its inner wall formed by the manifold 101. The end portion of manifold 132 located within journal 25 is closed off by end plate 134 and communicates, through ports 135 in journal 25, with a recess 136 of valve body 37. Recess 136 is connected to valve chamber 112 by passage 137.

The inner hollow cylindrical valve 114 functions as a regulator valve and is a two-diameter valve of substantially less length than the outer valve 113 in which it is rotatably mounted. The cylinder of valve 114 comprises a relatively large diameter cylindrical portion 139 and a relatively small diameter cylindrical portion 140 and is closed at its ends by end walls 139*a* and 140*a*.

The two valves are assembled with the large diameter end wall 139*a* of valve 114 fitted against the end wall 115 of valve 113 and with the smaller diameter end wall 140*a* of valve 114 spaced an appreciable distance inwardly from the end wall 116 of valve 113. The larger diameter cylindrical portion 139 of valve 114 is a close rotating fit in valve 113 but the smaller diameter cylindrical portion 140 of valve 114 is separated from the surrounding cylindrical portion of valve 113 by a clearance space 142 into which opens the previously mentioned port 127 of valve 113. The smaller diameter cylindrical portion 140 of valve 113 is provided with a series of ports 143 placing the interior of said valve in communication with the interior of valve 113.

The larger diameter portion 139 of valve 114 is provided with a port 145 and the surrounding portion of valve 113 is provided with ports 146 and 147. When the valve ports 145 and 146 register with each other with the valves 113 and 114 in the position shown in Figs. 6, 10 and 13, the suction manifold 132 is connected to main suction passage 98 via journal ports 135, valve body passage 137, registering ports 146 and 145 of valves 113 and 114, ports 143 of valve 114 and port 127 of valve 113.

When valves 113 and 114 are rotated to the shut-off position shown in Figs. 11 and 14, the port 147 of valve 113 places the manifold 132, recess 136 and passage 137 of valve body 37 in communication with the atmosphere via ports 145 and 143 of valve 114, port 127 of valve 113 and port 129 of valve casing 112. It will be thus seen that, in this position of valves 113 and 114, the vacuum in compartment 62 of nozzle 47 is broken.

An operating spindle 149, connected to the end wall 140*a* of valve 114, extends outwardly through the hollow spindle 122 of valve 113 and is equipped with a hand lever 149*a*. The frictional engagement of the two valves is such that they normally rotate as a unit in response to operation of valve 113 by its hand lever 122*a*. However, by holding the valve 113 stationary and rotating valve 114 by its hand lever 149*a*, the relative angular positions of the two valves may be changed as desired.

When valves 113 and 114 are in their relative position of angular adjustment shown in Figs. 10 and 11, the same degree of vacuum will be established in the compartments 57 and 62 of nozzles 46 and 47 when these nozzles are connected to the main suction-connection passage 98. In practice, however, it is desirable for economical and other reasons, to maintain the vacuum in nozzle compartments 62 at a lower value than that maintained in nozzle compartment 57. Accordingly, the valve 114 is preferably adjusted relative to valve 113 to a throttling position such as that shown in Figs. 12 and 12*a*. In this relative position of arrangement of the two valves, the passage 137 of valve body 37 is partially blocked off by a solid throttling portion of valve 114 so that a lower degree of vacuum is established in nozzle compartments 62 as compared with nozzle compartments 57 when the body of said compartments is connected to main suction-connection passage 98.

From the foregoing description it will be seen that the nozzle 46 functions as a high vacuum nozzle whereas the nozzle 47 functions as a low vacuum nozzle. The primary purpose of the low vacuum nozzle 47 is to overcome centrifugal forces which are set up in the paper web as it passes around the circumference of the pick-up roll and which tend to cause the paper to leave the pick-up roll carrying felt before it is picked up by the carrying felt of the transfer press through which the paper is passed to succeeding units of the paper making machine.

The manner in which suction pick-up roll 5 is mounted in operative relation to the paper machine forming wire to pick up the paper therefrom is illustrated in Figs. 1, 2 and 6. As shown more particularly in Fig. 1, the suction roll 5 and a portion of the pick-up felt 151 passing around said roll are arranged to bear against a stretch of the forming wire 151*a* passing from the couch roll 152 to the return guide roll 153.

When starting up the paper machine the valves 113 and 114 of control valve assembly 38 are in their previously described shut-off position in which the longer compartments 57 and 62 of the pick-up roll nozzles 46 and 47 are connected to atmosphere. The lead strip is cut from the paper web at the inlet end of the forming wire so that only this lead strip is picked up and drawn against the pick-up felt 151 by the shorter or lead strip pick-up compartments 56 and 61 of suction roll nozzles 46 and 47. The pick-up felt 151 cooperates with a transfer-press carrying felt (not shown) to pass the lead strip through the transfer-press to succeeding press sections and such conventional units of the paper machine. During this starting up operation the main body portion of the paper web is passed downwardly from the delivery end of the forming wire 151*a* to the underlying "broke" pit (not shown). After the lead strip has been passed through the various units of the paper machine the valves 113 and 114 are operated to place the longer compartments 57 and 62 of the pick-up roll suction nozzles 46 and 47 in communicaiton with the source of suction to enable the pick-up roll and the pick-up felt to pick up the full width of the paper web from the forming wire.

Figure 1A:
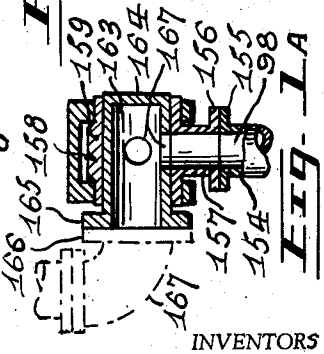

The pick-up roll 5 is mounted for swinging movement about a horizontal axis (compare Figures 1, 2 and 3) so that it may be raised or lowered with reference to the forming wire 151*a*. In this connection it will be noted that the body 37 of valve assembly 38 is formed with a tubular extension 154 through which the previously mentioned main suction-connection passage 98 extends. This extension 154 terminates in a flange 155 which is bolted or otherwise secured to a flange 156 carried by the stem portion 157 of a substantially T-shaped hollow mounting member 158. The ends of the head portion 159 of member 158 are rotatably mounted in a sectional bearing member 160 secured to a suitable supporting member 161. A stationary sleeve 163 (Fig. 1*a*) extends through the head portion 159 of member 158 and is closed at one end as indicated at 164. The other end of sleeve 163 is open and is provided with a flange 165 which is bolted or otherwise secured to the flange 166 of a main suction conduit 167 which is connected to a suction pump or other suitable source of suction. The intermediate portion of sleeve 163 is provided with ports 167 through which the main suction passage 98 of valve assembly 38 is placed in communication with the suction conduit 173.

The gear casing 16 (Figs. 1 and 3) is provided at the end remote from the roll journal 22 with tubular bearing portions 169 rotatably mounted in a bearing member 170 which is aligned with the previously mentioned bearing member 160 and is secured to a suitable supporting member 171.

The previously mentioned drive shaft 20 extends through the bearing portion 169 of gear casing 16 and is journalled in said bearing portions by anti-frictional bearings 172.

The embodiments of the invention in which an exclusive property or privilege is claimed are defined as follows:

1. In a paper making machine of the class described, in combination, a suction pick-up roll, a suction box disposed within said suction roll, a suction nozzle supported by said suction box, said suction nozzle having a partition therein extending transversely across the width of said nozzle, said partition dividing said nozzle into suction compartments of unequal length, manifold means connecting the shorter compartment with a source of suction, external valve means, independent manifold means connecting the longer compartment with said external valve means, said valve means adapted to connect the longer compartment with a source of suction and with atmosphere.

2. In a paper making machine according to claim 1 and further including pressure applying tubes interposed between the nozzle and the suction box and serving to force the mouth portion of the nozzle into sealing engagement with the suction pick-up roll.

3. In a paper making machine of the class described, a suction pick-up roll, a pair of suction nozzles supported within said suction roll, said suction nozzles being disposed in side by side relation and being of unequal width, each of said nozzles having a partition therein dividing each nozzle into separate compartments of unequal length, the shorter of said compartments of both of the nozzles being connected together, manifold means for connecting the shorter compartments with a source of suction, an external valve, independent manifold means for each of said longer compartments for connecting said compartments with said external valve, said external valve including means for connecting each of said compartments with a source of suction and atmosphere and for throttling the pressure applied to one of said longer compartments.

4. In a paper making machine according to claim 3 and further including pressure applying tubes interposed between the nozzle and the suction box and serving to force the mouth portion of the nozzle into sealing engagement with the suction pick-up roll.

References Cited in the file of this patent

UNITED STATES PATENTS

| | | |
|---|---|---|
| 2,289,430 | Jennings | July 14, 1942 |
| 2,312,519 | Berry | Mar. 2, 1943 |
| 2,338,465 | Street | Jan. 4, 1944 |
| 2,649,719 | Hornsbostel | Aug. 25, 1953 |
| 2,714,342 | Beachler | Aug. 2, 1955 |
| 2,718,825 | Goodwillie | Sept. 27, 1955 |